J. M. HOTHERSALL.
BURNER STAND.
APPLICATION FILED AUG. 16, 1915.
1,310,830.
Patented July 22, 1919.
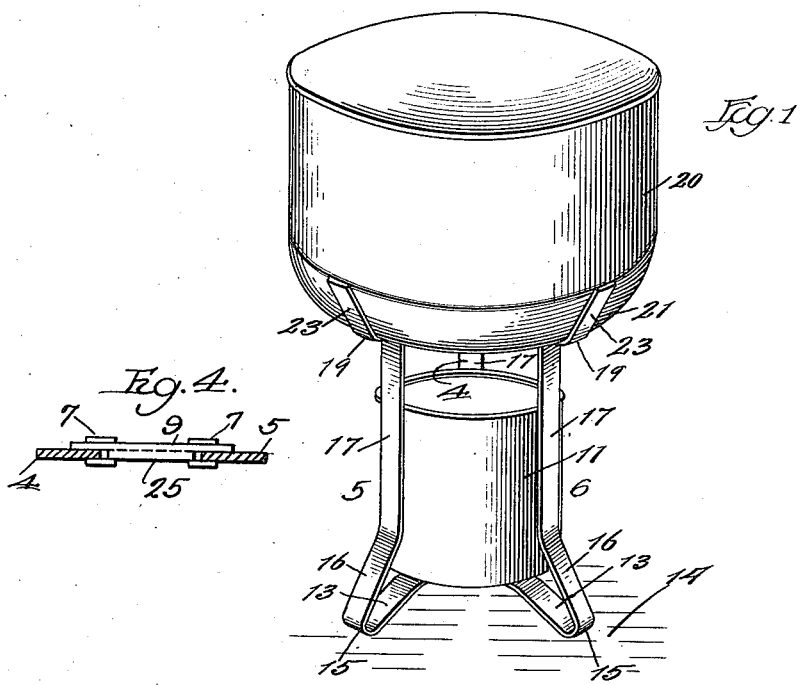
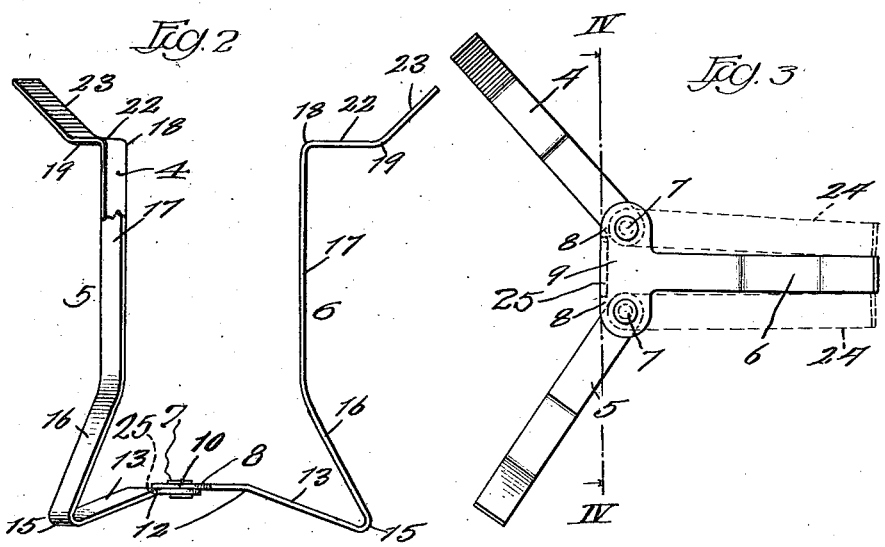

UNITED STATES PATENT OFFICE.

JOHN M. HOTHERSALL, OF BROOKLYN, NEW YORK, ASSIGNOR TO AMERICAN CAN COMPANY, OF NEW YORK, N. Y., A CORPORATION OF NEW JERSEY.

BURNER-STAND.

1,310,830.  Specification of Letters Patent.  Patented July 22, 1919.

Application filed August 16, 1915. Serial No. 45,649.

*To all whom it may concern:*

Be it known that I, JOHN M. HOTHERSALL, a citizen of the United States, residing in Brooklyn, in the county of Kings and State of New York, have invented a new and useful Improvement in Burner-Stands, of which the following is a specification.

This invention relates in general to burner stands and has more particular reference to burner stands provided for use in connection with alcohol and similar heating agents.

A principal object of the invention is the provision of a cheap and inexpensive burner stand of improved construction adapted to support a cooking utensil or the like above a container of alcohol or similar heating agent.

A further object is the improvement of stands of this character to provide a more sure support of the cooking utensil and this without increasing the difficulty of its removal from the burner.

A further object of the invention is the provision of a burner stand of the character described which is readily collapsible or foldable when not in use.

A still further object of the invention is the provision of a collapsible burner stand, the parts of which will be so constructed and arranged that when folded each part will reinforce and prevent damage to the others, thereby permitting the use of lighter material in its construction than where each part must rely solely upon its own inherent properties.

A still further object of the invention is the provison of a burner stand which will hold the burner in accurate central position beneath the cooking utensil through the contact of flap strip legs against the side of the burner.

Other objects and advantages of the invention will be apparent as it is better understood from the following description when considered in connection with the accompanying drawing illustrating a preferred embodiment thereof.

Figure 1 is a perspective view of a burner stand embodying my invention shown in use with a burner of solid alcohol and a cooking utensil of proper form;

Fig. 2 is a similar view of the stand alone; and

Fig. 3 is a top plan view of the same.
Fig. 4 is a vertical section on line IV—IV of Fig. 3, illustrating the lip which limits the opening movement of the legs.

For the purpose of illustrating my present invention I have shown it embodied in a burner stand comprising three legs, 4, 5 and 6, each constructed of a flat sheet metal strip appropriately bent to desired formation. The lower ends of two of the legs, 4 and 5, are pivoted at 7 upon ears or lugs 8 extending outwardly from the sides of the lower end 9 of the leg 6, these ears or lugs being provided by merely cutting the strip which forms the leg 6 wider at this end. The joint thus provided between the legs is designed to form an elevated rest or stand 10 for a burner 11 containing solid alcohol or other suitable burning material. The elevation of this support is provided by bending downwardly the legs at 12 near their connection. This provides an inclined portion 13 in each leg reaching to the table or other support 14. From the points of support 15 the legs are bent upwardly and inwardly to provide upwardly inclined portions 16 which bring the main parts 17 of the legs into contact with the sides of the burner 11 and yet permit the provision of a wide support base to prevent inadvertent tipping over of the stand while in use. The substantially vertical position of the main parts 17 of the legs not only furnishes a close clasp for the vessel of considerable vertical extent but also enables them to stiffly resist the weight of the vessel. Above the portions 17 the legs are bent outwardly at 18 and upwardly again at 19 to permit a strong supporting embracing contact with the cooking utensil 20. This utensil is provided with a flaring bottom 21 fitting nicely within the parts 22 and 23 of the legs formed by the bends 18 and 19. When thus constructed the burner is held in accurate central position beneath the cooking utensil and a proper application of heat to the latter is provided for.
The lugs 8 extend outwardly at each side of the end 9 of the leg 6 a distance equal to the width of the legs 4 and 5 so that these legs may be swung backwardly as indicated in dotted lines at 24 in Fig. 3 to permit storing of the holder, and they are so located that the ends of the three legs are disposed in substantial alinement when the holder is folded, thereby eliminating ready bending of the legs when packed away with other articles, each leg being capable of reinforcing the others. The end 9 of the leg 6 is provided with a downwardly extending lip 25 (dotted lines Fig. 3) to limit opening movement of the legs 4 and 5.

It is thought that the invention and many of its attendant advantages will be understood from the foregoing description, and it will be apparent that various changes may be made in the form, construction and arrangement of the parts without departing from the spirit and scope of the invention or sacrificing any of its material advantages, the form hereinbefore described being merely a preferred embodiment thereof.

I claim:—

A burner stand of flat metal strips with their flat faces presented inward and upward and forming a tripod, one member of which is cut at its lower end to form horizontal lateral lugs and a downwardly extending lip, and the other two members of which are pivoted to said lugs and are adapted to fold parallel with the first member and also to engage said lip when the parts are turned out in vessel-supporting arrangement, the three members being bent outward and downward from their points of connection to form supporting feet, and thence upward and inward, and thence vertically upward to form a clasp for a burner and stiffly resist the weight of a vessel and thence outward and upward to form a top vessel support.

Signed in the presence of two subscribing witnesses.

JOHN M. HOTHERSALL.

Witnesses:
W. D. FOSTER,
ADOLPH E. J. HOERL.